Feb. 8, 1938.   J. F. HOLLOWAY   2,107,296
TRUCK
Filed Aug. 25, 1934   3 Sheets-Sheet 1
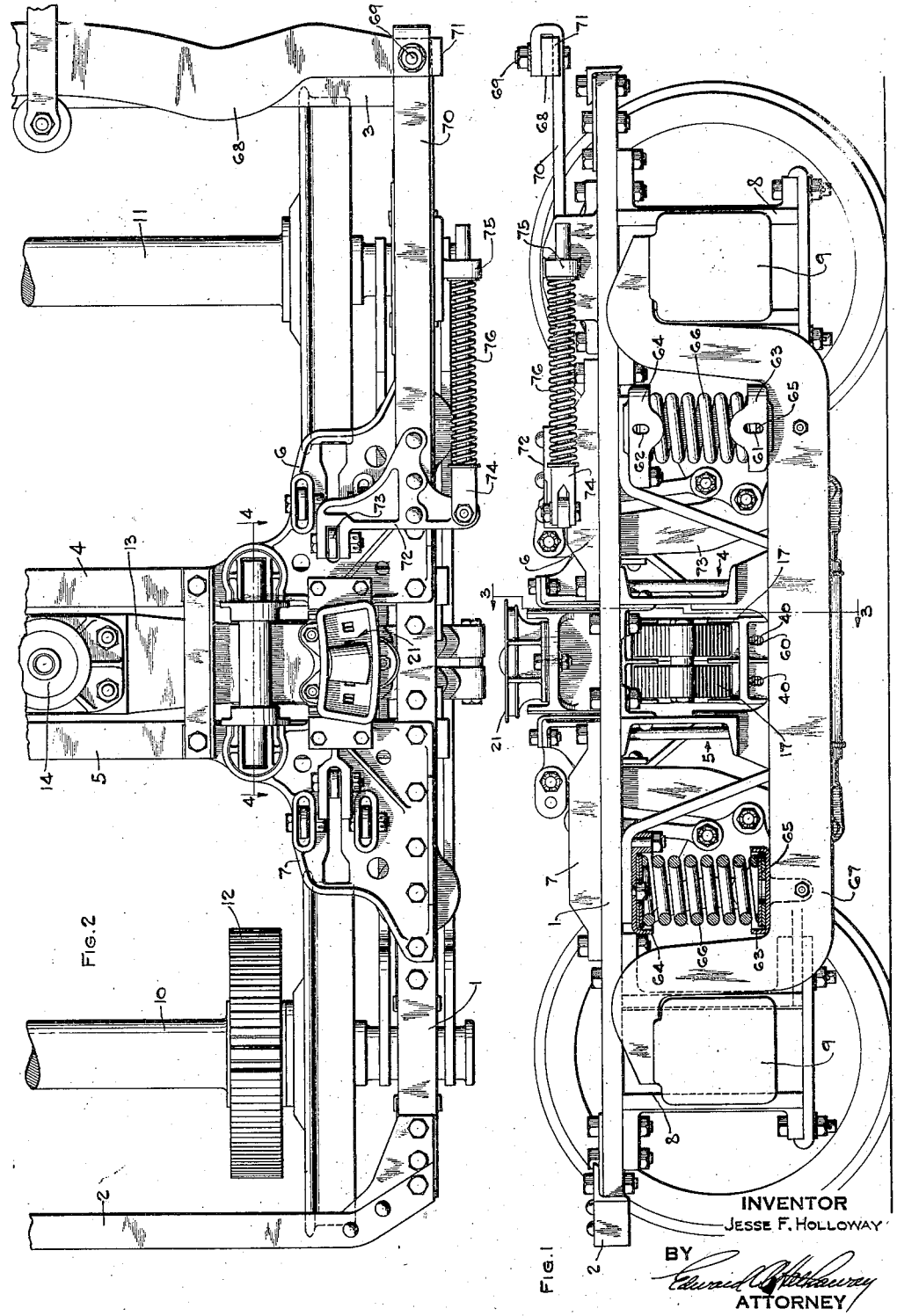
INVENTOR
JESSE F. HOLLOWAY
BY
ATTORNEY Feb. 8, 1938.  J. F. HOLLOWAY  2,107,296
TRUCK
Filed Aug. 25, 1934  3 Sheets-Sheet 2
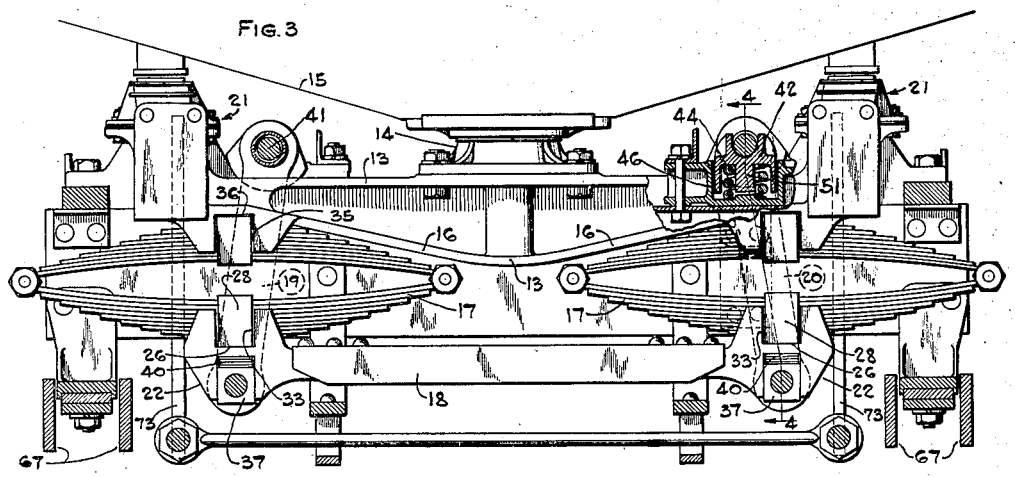
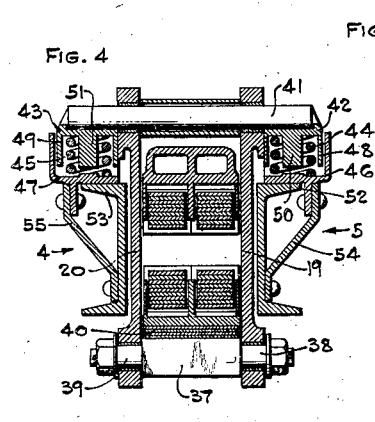
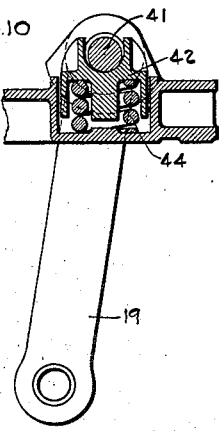
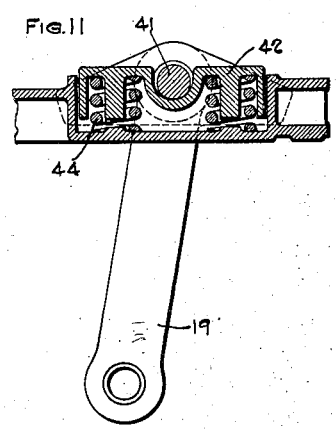
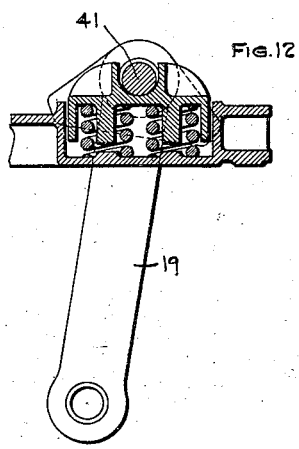
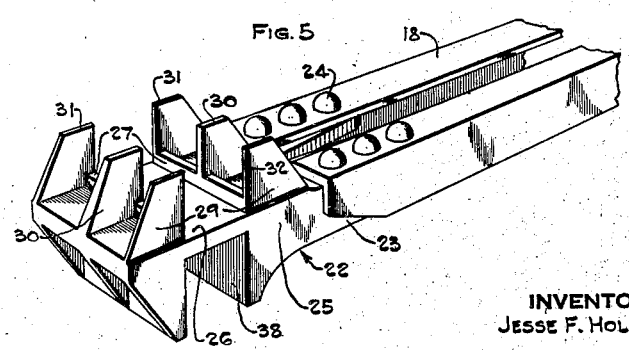
INVENTOR
JESSE F. HOLLOWAY
BY
ATTORNEY Feb. 8, 1938. J. F. HOLLOWAY 2,107,296
TRUCK
Filed Aug. 25, 1934 3 Sheets-Sheet 3

INVENTOR
Jesse F. Holloway
BY
ATTORNEY

Patented Feb. 8, 1938

2,107,296

UNITED STATES PATENT OFFICE 2,107,296

TRUCK

Jesse F. Holloway, Aldan, Pa.

Application August 25, 1934, Serial No. 741,357

9 Claims. (Cl. 105—190)

This invention relates generally to trucks for railway equipment and more particularly to trucks adapted for high speed electric passenger cars although certain improvements herein disclosed may be employed in trucks for other classes of railway vehicles or service.

A great many different truck designs have heretofore been proposed or built, particularly for present-day types of high speed equipment, but the same have been deficient in various respects, especially in regard to easy riding qualities combined with a high degree of stability and ruggedness.

It is one object of my present invention to provide an improved truck to overcome more effectively prior difficulties, and to accomplish this I have provided an improved combination of elements whereby they are adapted to cooperate as a whole to produce a truck having all the desired qualities above mentioned in addition to minimizing vibration and thereby materially adding to the life of the wearing parts of the truck. A further object in this respect is to provide improved auxiliary springs for supporting the upper ends of bolster swing links whereby the springs are of sufficient capacity to carry the light load of the car body and yet will, on application of part of the live load of passengers, baggage, etc., go out of action automatically, preferably before the springs close solid.

Other objects and advantages will be more apparent to those skilled in the art from the following description of the accompanying drawings in which:

Fig. 1 is a side elevation of a truck embodying my improved features;

Fig. 2 is a plan view of Fig. 1 showing one-half of a truck;

Fig. 3 is a vertical transverse section taken substantially on the line 3—3 of Fig. 1;

Fig. 4 is a vertical section taken substantially on the lines 4—4 of Figs. 2 and 3;

Fig. 5 is a perspective of one end of a spring plank embodying my improved anti-canting guides and seats;

Fig. 10 is a vertical section showing the manner in which auxiliary springs are embodied in an integral truck frame;

Fig. 11 is a view similar to Fig. 10 but showing a modified arrangement of auxiliary springs wherein two springs are disposed on each transom member;

Fig. 12 is a vertical section similar to Figs. 10 and 11 but showing a clearly modified arrangement of a plurality of auxiliary springs to be mounted on each transom member.

Figure 6:
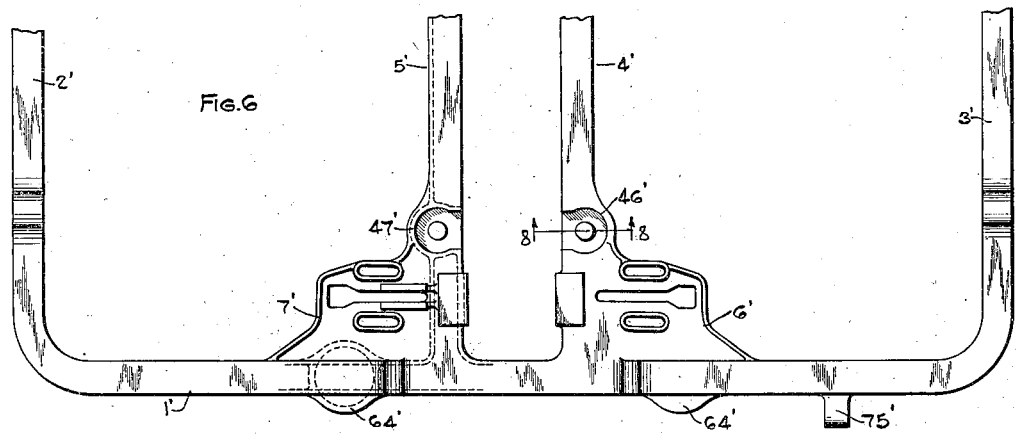
Fig. 6 is a fragmentary plan view of one side of an integrally cast truck frame.

In the illustrated embodiments of my invention which are shown herein merely for the purpose of disclosing certain specific forms among possible others that the invention might take, I have provided in Fig. 2 a truck of a conventional standard form having a frame comprising a pair of parallel wheel pieces 1 connected by end pieces 2 and 3 and transoms 4 and 5. In this built-up form of truck shown in Fig. 2, the transoms and wheel pieces are connected by any suitable or usual types of gussets such as 6 and 7. The wheel pieces have pedestals 8 for guiding usual journal boxes 9. The wheel axles 10 and 11 are journalled in said boxes and may if desired be provided with a driving gear 12.

Disposed between the transoms 4 and 5 is a usual swing bolster 13 having a center bearing 14 for supporting any suitable car body or frame diagrammatically indicated at 15, Fig. 3. As shown in Fig. 3, the upper side of the bolster 13 extends substantially horizontal throughout its length while the under side at 16 is inclined upwardly to finally rest on bolster springs 17. These springs in turn are supported on a spring plank 18, and this is hung from transoms 4 and 5 by swing links 19 and 20. Cast as part of the swing bolster are side bearings 21 of the roller type which, however, do not form a part of my present invention. Various features of the foregoing elements will now be described more in detail.

My improved anti-canting guides and seats for the bolster springs are seen more clearly in Fig. 5 wherein the spring plank 18 has its outer end provided preferably with a cast member 22, this member having tongues 23 riveted as at 24 to the main cross members of the spring plank 18. Projecting forwardly from the tongues 23 is a horizontal portion 25 forming a spring seat 26 bounded by parallel lips 27 whereby a recess is formed to receive spring bands 28, Fig. 3. As shown in Fig. 1, there is a pair of bolster springs supported on each end of the spring plank and to guide the same, while at the same time preventing canting thereof, I have provided improved anti-canting spring guides 29, 30, and 31, each of which is formed in pairs projecting upwardly from and integral with the horizontal portion 25. The opposed vertical edges such as 32 of guides 29 engage the vertical edges 33 of the spring band 28, thereby providing a very substantial vertical guiding support for the spring band and at the same time preventing canting of the spring (that is, preventing one end of the spring going up and one end of the spring going down). Similarly the opposed vertical edges of the center guides 30 will engage the spring band on the other side of the spring from that shown in Fig. 3. It will be noted that the center guides 30 have greater thickness than the end guides 29 and 31. This is for the purpose of permitting the spring band of the second bolster spring to be engaged also by the center guide 30.

The upper half of the bolster springs is seated and guided in the same manner as that just described for seating and guiding the springs on the spring plank. However, it will be noted that the guides such as 35 and seat 36 for the bolster are preferably cast integral therewith, it being understood, of course, that there is a corresponding number of upper guides as there are lower guides such as 29—31. Also that such guides both on the bolster and spring plank are duplicated at each end thereof.

The swing links 19 and 20 support the spring plank through a bearing block 37 disposed in a guideway 38 which projects downwardly from the under side of the horizontal portion 25 of the spring plank, Figs. 3 and 5. The bearing block 37 as shown in Fig. 4 has its outer ends turned down to form trunnions 38 and 39 on which the lower ends of the swing links 19 and 20 are journalled. To obtain the proper adjustment of the spring plank and bolster springs, and relative heights of car body from the rail, with respect to the swing links, any number of suitable liners 40 may be interposed between the bearing block 37 and the under side of the horizontal portion 25, specifically beneath the spring seat 26. The swing links 19 and 20 are journalled at their upper ends on a pin 41, the outer ends of this pin being supported on auxiliary spring seats 42 and 43 of my improved auxiliary spring construction. A pair of longitudinally spaced coil springs 44 and 45 are interposed between the seats 42 and 43 and the bottom of spring pocket members 46 and 47. The spring seat member has preferably an outer cylindrical guiding shell 48 and 49 and inner limiting stop members 50 and 51. These stop members are adapted to engage the bottom of the spring pockets, which if desired may be provided with a slightly upwardly projecting boss. The spring pockets rest on the upper flanges 52 and 53 of the built-up transom member 4 and 5. A pair of Z brackets 54 and 55 connect the pockets to the sides of the transoms 4 and 5. The spring pockets are as shown in Fig. 2 formed integrally with the gussets 6 and 7, and hence it is seen that the brackets 54 and 55 not only transmit any eccentric loading from the spring pockets directly to the transom members but also serve to provide a more rigid unit between the component parts of the truck frame.

One object of the limit stops 50 and 51 is that after auxiliary springs 44 and 45 take the light or empty load of the car, then stops 50 and 51 will prevent further compression of the auxiliary springs, after which any additional load will be transmitted through the bolster 13 and directly to the bolster springs only, without in any way subjecting the auxiliary springs to undue stresses or distortion.

Figure 7:
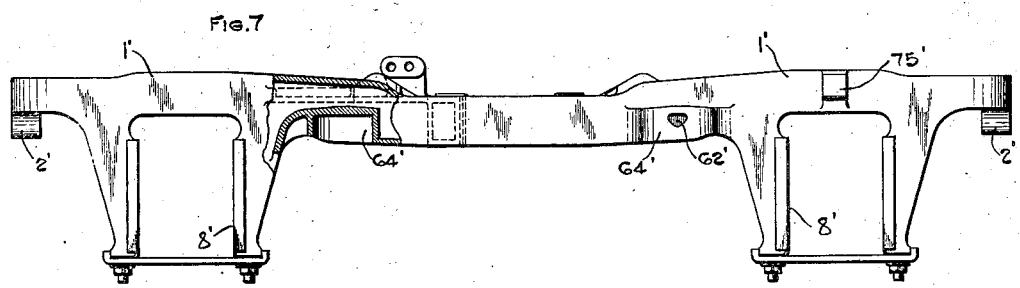
Fig. 7 is a side elevation of Fig. 6 viewed in the direction of the arrow a thereof.
Figure 8:
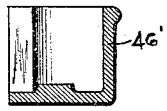
Fig. 8 is a vertical section taken on the line 8—8 of Fig. 6 showing the auxiliary spring pocket.
Figure 9:
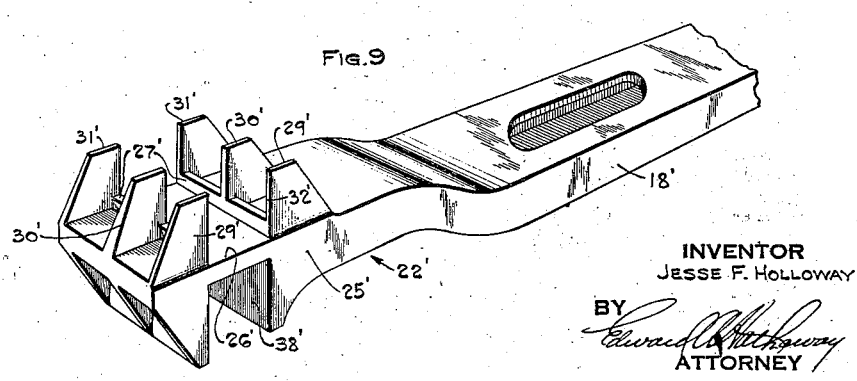
Fig. 9 is a perspective of an integral spring plank similar to Fig. 5.

As shown in Figs. 6 to 9, the truck frame, transom and gussets may be cast as a single integral member and likewise the spring plank and anticanting guides and seat may be cast as a single member. Similar parts of the cast and built-up forms are given the same reference characters except that the integral form has the numbers primed.

To insure proper cooperation between the various springs, it is essential that the tension thereof should be proportioned in a predetermined manner. However, due to the generally rough character of construction employed in truck equipment, I have provided improved means for accurately determining the proper seating relation of the springs. For example, in connection with the liners 40 (Fig. 4) placed between the swing link bearing block 37 and the horizontal portion 25 of the transoms, I am able to observe the precise number of liners as through suitable openings 60 (Fig. 1) formed in the outer one of the guiding walls 38 (Fig. 5). Likewise by the provision of openings 61 and 62 in the caps 63 and 64, I am able to determine the number of liners 65 between the equalizer springs 66 and the seats, and these openings also aid in checking the heights of the springs. These springs, as is usual, are interposed between equalizer beams 67 and the wheel pieces 1.

The brake rigging includes a brake cross equalizer beam 68, Fig. 2, pivotally connected as at 69 to a brake pull rod 70. The pivotal end of the pull rod is reversely bent over the equalizer 68, while the outer end of the equalizer is upturned as at 71 to prevent pull rod 70 from sliding off of the equalizer 68 in case pivotal bolt 69 drops out. It is understood, of course, that the construction as shown is duplicated on each side of the truck. The inner end of pull rod 70 is secured to a cast member 72 whose inner end is pivotally secured to a vertical brake lever 73 and whose outer end is pivotally connected to a spring rod 74. Surrounding this rod and interposed between a shoulder thereon and a lug 75 projecting outwardly from the wheel piece 1 is a compression spring 76 adapted normally to move pull rod 70 and equalizer 68 inwardly to release the brakes. As a result of these compression brake release springs, the brake rigging is adapted due to smoothness of operation to augment the riding qualities of the truck.

From the foregoing disclosure of the various truck features, it is seen that I have provided a unitary truck whose component elements are very effectively coordinated to insure stability and ruggedness while at the same time permitting a desirable degree of flexibility and easy riding qualities.

It will of course be understood that various changes in details of construction and arrangement of parts may be made by those skilled in the art without departing from the spirit of the invention as set forth in the appended claims.

I claim:

1. A railway truck comprising, in combination, a truck frame, a swing bolster, means for supporting said bolster including longitudinally spaced auxiliary springs supported by said frame, a pivot pin supported on said springs, a pair of swing links supported on said pin and extending downwardly between said springs, a spring plank, main springs interposed between said plank and bolster, and means for pivotally supporting the lower end of said links to said spring plank.

2. The combination set forth in claim 1 further characterized in that said main springs extend between said swing links.

3. The combination set forth in claim 1 further characterized by the provision of a spring seat member interposed between each auxiliary spring and the pivot pin, and spring pocket members secured to said truck frame to provide a guiding wall for said spring seat.

4. The combination set forth in claim 1 further characterized by the provision of spring seat members interposed between said auxiliary springs and the pivot pin, and means for limiting the compression of said auxiliary springs.

5. The combination set forth in claim 1 further characterized by the provision of spring seat members interposed between said auxiliary springs and the pivot pin, and stop elements carried by said seat members and projecting downwardly within said auxiliary springs for engagement with said truck frame upon a predetermined compression of said auxiliary springs.

6. A railway truck comprising, in combination, a truck frame having a pair of wheel pieces and a pair of spaced transverse transoms, a swing bolster disposed between said transoms, means for supporting said bolster including auxiliary springs mounted on top of each of said transoms, a pivot pin supported on said auxiliary springs and extending across the top of said bolster, a pair of swing links supported on said pin and extending downwardly between said transoms and bolster, a spring plank, means for pivotally connecting the lower ends of said links to said plank, bolster springs interposed between said plank and bolster, a gusset plate connecting said wheel pieces and transoms, and means forming pockets within said gussets to receive said auxiliary springs.

7. A railway truck comprising, in combination, a truck frame having a pair of wheel pieces and a pair of spaced transverse transoms, a swing bolster disposed between said transoms, means for supporting said bolster including auxiliary springs mounted on top of each of said transoms, a pivot pin supported on said auxiliary springs and extending across the top of said bolster, a pair of swing links supported on said pin and extending downwardly between said transoms and bolster, a spring plank, means for pivotally connecting the lower ends of said links to said plank, bolster springs interposed between said plank and bolster, a gusset plate connecting said wheel pieces and transoms, means forming pockets within said gussets to receive said auxiliary springs, and brackets extending from lateral points of said gussets adjacent said spring pockets downwardly for connection to said transoms.

8. A railway truck comprising, in combination, a truck frame, a swing bolster, means for supporting said bolster including auxiliary springs supported by said frame, a pivot pin supported on said springs, a pair of swing links supported on said pin and extending downwardly between said springs, a spring plank, main springs interposed between said plank and bolster, and means for pivotally supporting the lower end of said links to said spring plank, a plurality of said auxiliary springs being disposed at each end of the pivot pin and the axes of said springs being disposed on each side of the pivot pin.

9. A railway truck comprising, in combination, a truck frame, a swing bolster, means for supporting said bolster including longitudinally spaced auxiliary springs supported by said frame, a pivot pin supported on said springs, a pair of swing links supported on said pin and extending downwardly between said springs, a spring plank, main springs interposed between said plank and bolster, and means for pivotally supporting the lower end of said links to said spring plank, a plurality of said auxiliary springs being disposed at each end of the pivot pin and the axis of said springs being disposed on each side of the pivot pin, each set of said plurality of auxiliary springs having a common spring seat member interposed between said springs and the pivot pin.

JESSE F. HOLLOWAY.